(12) United States Patent
Chen et al.

(10) Patent No.: US 10,689,892 B2
(45) Date of Patent: Jun. 23, 2020

(54) HINGE MECHANISM AND A COOKING DEVICE WITH THE HINGE MECHANISM

(71) Applicant: Tsann Kuen (Zhangzhou) Enterprise Co., Ltd., Fujian (CN)

(72) Inventors: Haiqiang Chen, Fujian (CN); Zhenshan Huang, Fujian (CN)

(73) Assignee: TSANN KUEN (ZHANGZHOU) ENTERPRISE CO., LTD., Fujian (CN)

( * ) Notice: Subject to any disclaimer, the term of this patent is extended or adjusted under 35 U.S.C. 154(b) by 81 days.

(21) Appl. No.: 15/868,356

(22) Filed: Jan. 11, 2018

(65) Prior Publication Data
US 2018/0209188 A1  Jul. 26, 2018

(30) Foreign Application Priority Data

Jan. 23, 2017  (CN) .......................... 2017 1 0058846

(51) Int. Cl.
| | |
|---|---|
| *E05D 3/06* | (2006.01) |
| *A47J 37/06* | (2006.01) |
| *E05D 3/12* | (2006.01) |
| *E05D 7/00* | (2006.01) |
| *E05D 11/06* | (2006.01) |

(52) U.S. Cl.
CPC ............ *E05D 3/06* (2013.01); *A47J 37/0611* (2013.01); *E05D 3/12* (2013.01); *E05D 7/00* (2013.01); *A47J 2037/0617* (2013.01); *E05D 11/06* (2013.01); *E05Y 2900/30* (2013.01)

(58) Field of Classification Search
CPC .... E05D 3/06; E05D 3/12; E05D 7/00; E05D 11/06; E05Y 2900/30; Y10T 16/547
See application file for complete search history.

(56) References Cited

U.S. PATENT DOCUMENTS

| | | | | |
|---|---|---|---|---|
| 809,137 | A * | 1/1906 | Saling ....................... | E05D 3/12 16/366 |
| 828,649 | A * | 8/1906 | Greenawalt ............... | E05D 3/12 16/366 |
| 4,858,488 | A * | 8/1989 | Butts ......................... | E05D 3/06 74/519 |
| 5,737,183 | A * | 4/1998 | Kobayashi ............ | G06F 1/1626 16/366 |
| 5,943,739 | A * | 8/1999 | Vandergriff ............... | E05D 3/12 16/221 |

(Continued)

OTHER PUBLICATIONS

The Search Report issued to European counterpart application No. 18152443.0 by the EPO dated Jun. 15, 2018.

*Primary Examiner* — Victor D Batson
*Assistant Examiner* — Matthew J Sullivan
(74) *Attorney, Agent, or Firm* — Muncy, Geissler, Olds & Lowe, P.C.

(57) ABSTRACT

A hinge mechanism of a cooking device for connecting a first object and a second object to allow relative folding and unfolding movements with respect to each other, includes first and second coupling seat respectively connected with the first and second objects, and a pivot mounting seat pivotably connected with the first coupling seat by a first pivot unit, and pivotably connected with the second coupling seat by a second pivot unit. The hinge mechanism is shiftable between an open position and a first closed position, or between the open position and a second closed position to accommodate first objects of various heights.

15 Claims, 10 Drawing Sheets

(56) References Cited

U.S. PATENT DOCUMENTS

| | | | | |
|---|---|---|---|---|
| 6,152,410 | A * | 11/2000 | Mark | A47B 81/06 248/220.1 |
| 6,276,263 | B1 * | 8/2001 | Huang | A47J 37/0611 99/375 |
| 6,910,373 | B2 * | 6/2005 | Dempster | E05D 3/12 16/235 |
| 8,887,849 | B2 * | 11/2014 | Hite | E05D 5/0207 180/69.2 |
| 10,087,667 | B2 * | 10/2018 | Girotto | E05D 15/1065 |
| 10,146,268 | B2 * | 12/2018 | Tazbaz | E05D 3/06 |
| 2002/0004969 | A1 | 1/2002 | Richard | |
| 2011/0041290 | A1 * | 2/2011 | Herglotz | E05D 3/06 16/375 |
| 2018/0216380 | A1 * | 8/2018 | Butler | E05D 1/06 |
| 2018/0230726 | A1 * | 8/2018 | Chen | E05D 11/10 |

\* cited by examiner

HINGE MECHANISM AND A COOKING DEVICE WITH THE HINGE MECHANISM

CROSS-REFERENCE TO RELATED APPLICATION

This application claims priority of Chinese Patent Application No. 201710058846.4, filed on Jan. 23, 2017.

FIELD

The disclosure relates to a cooking device, and more particularly to a cooking device with a hinge mechanism connecting two objects to permit rotation relative to each other.

BACKGROUND

A conventional grill device generally has two shells, a hinge pivotably interconnecting the shells to allow relative folding and unfolding movements with respect to each other, and two grill plates respectively mounted on the shells. For grilling a variety of food, one of the shells is made to accommodate grill plates of different depths. However, when it is desired to use a deep grill plate that has a higher peripheral rim projecting from the shell with a larger height, the shells cannot be successfully superimposed upon each other when folded.

Figure 1:
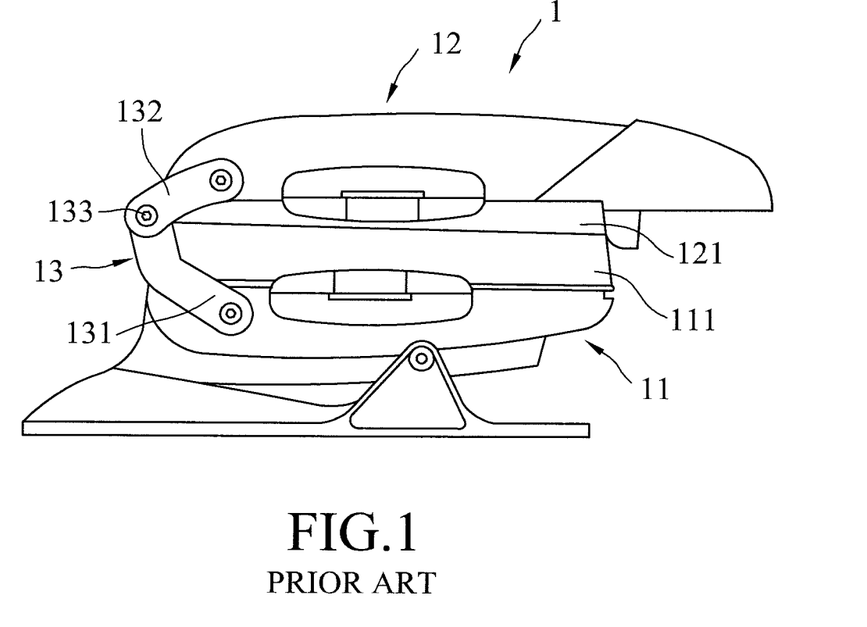
FIG. 1 is a schematic side view of a conventional grill device.
Figure 2:
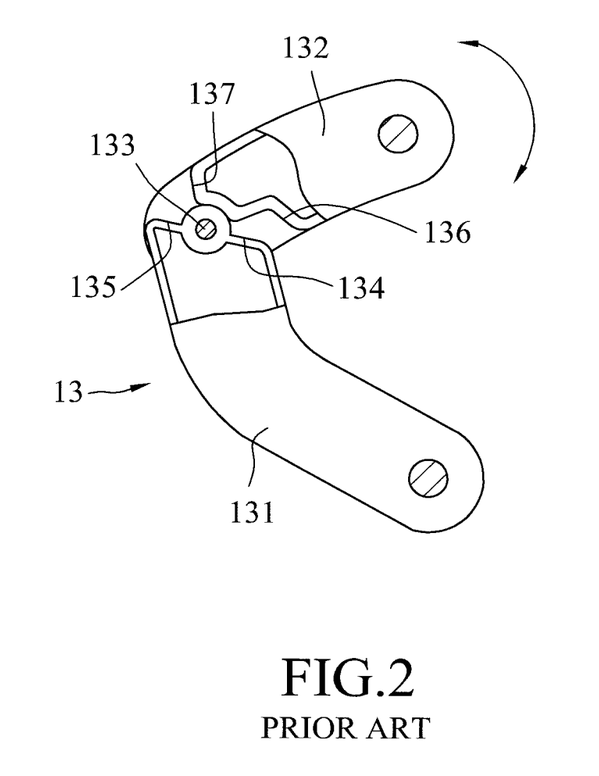
FIG. 2 is a schematic, partly sectional view of a hinge mechanism of the conventional grill device.

Referring to FIGS. 1 and 2, a conventional grill device 1 includes a lower grill unit 11, an upper grill unit 12, and two hinge mechanisms 13 (only one is shown) respectively disposed at left and right sides of the grill device 1 and pivotably connecting the upper grill unit 12 with the lower grill unit 11. Each of the hinge mechanisms 13 is in the form of a linkage mechanism, and includes lower and upper shafts 131, 132 which are respectively connected to the lower and upper grill units 11, 12 and which are linked to each other by pins 133, such that the upper grill unit 12 is moved to permit an upper grill plate 121 of the upper grill unit 12 to be superimposed upon a lower grill plate 111 of the lower grill unit 11 when the grill device 1 is closed. The lower and upper shafts 131, 132 are respectively formed with front positioning surfaces 134, 136 that abut against each other when the upper grill plate 121 is stacked upon the lower grill plate 111 of a smaller height, and are respectively formed with rear positioning surfaces 135, 137 that abut against each other when the grill device 1 is opened. However, the hinge mechanism 13 is liable to sway when a lower grill plate 111 of a larger height is employed and there is no positioning structure for positioning the hinge mechanism 13 in a closed position of the grill device 1, which renders use of the grill device 1 unstable and unsafe. Moreover, the hinge mechanism 13 is bulky and is exposed at two sides of the grill device 1, which adversely affect the outer appearance of the grill device 1.

SUMMARY

Therefore, an object of the disclosure is to provide a hinge mechanism and a cooking device with the hinge mechanism that can alleviate at least one of the drawbacks of the prior art.

According to the disclosure, the hinge mechanism is provided for connecting a first object and a second object to allow relative folding and unfolding movements with respect to each other, and includes a first coupling seat adapted to be connected with the first object, a second coupling seat adapted to be connected with the second object, a pivot mounting seat, a first pivot unit disposed to pivotably connect the first coupling seat with the pivot mounting seat to permit rotation relative to each other about a first pivot axis, and a second pivot unit disposed to pivotably connect the second coupling seat with the pivot mounting seat to permit rotation relative to each other about a second pivot axis such that, when both the pivot mounting seat and the second coupling seat are rotated relative to the first coupling seat about the first pivot axis, the hinge mechanism is shifted between an open position and a first closed position, and that, when the second coupling seat is rotated relative to the pivot mounting seat about the second pivot axis, the hinge mechanism is shifted between the open position and a second closed position.

According to the disclosure, the cooking device includes the first object, the second object, and the hinge mechanism disposed to connect the first and second objects to allow relative folding and unfolding movements with respect to each other.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 3:
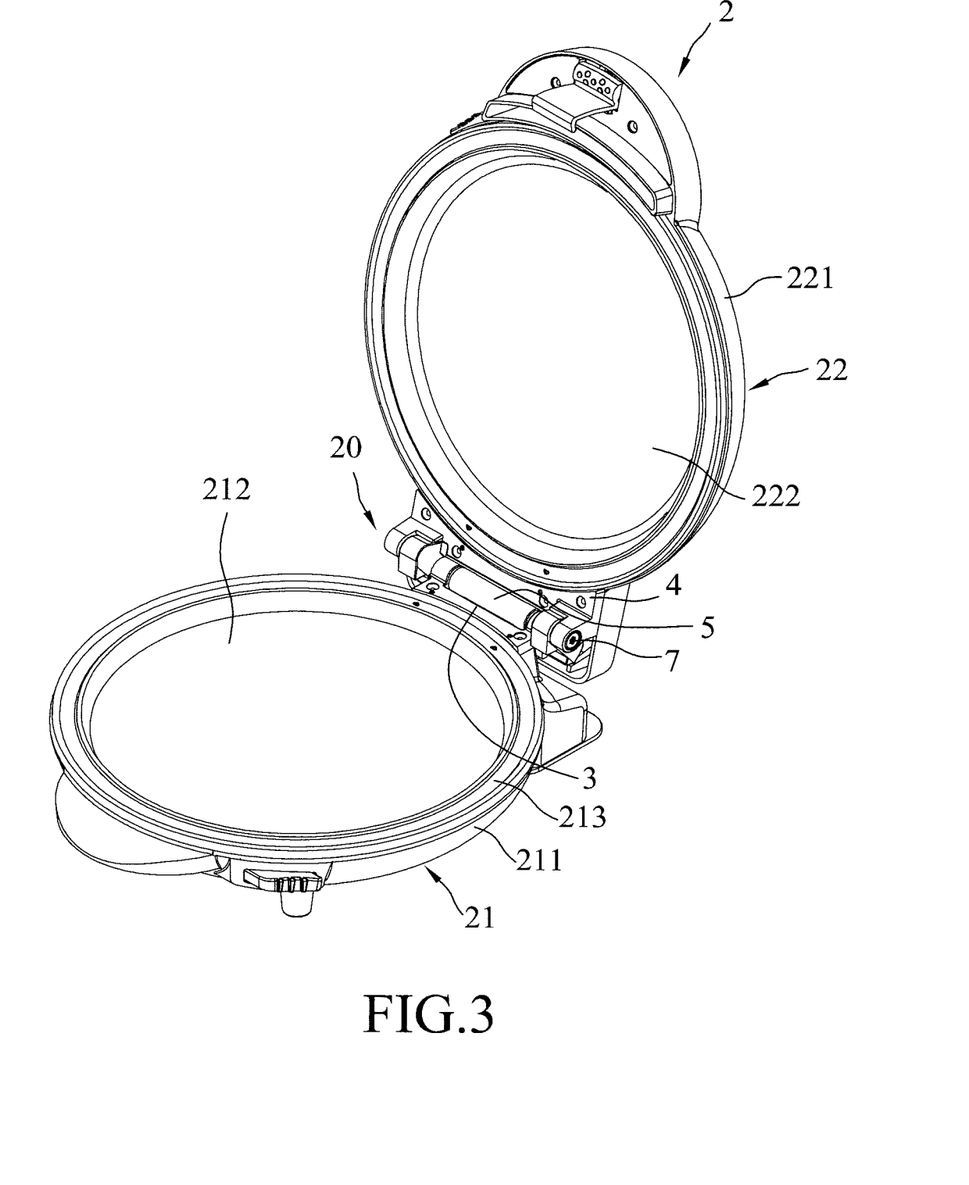
FIG. 3 is a perspective view illustrating a first embodiment of a cooking device according to the disclosure.
Figure 4:
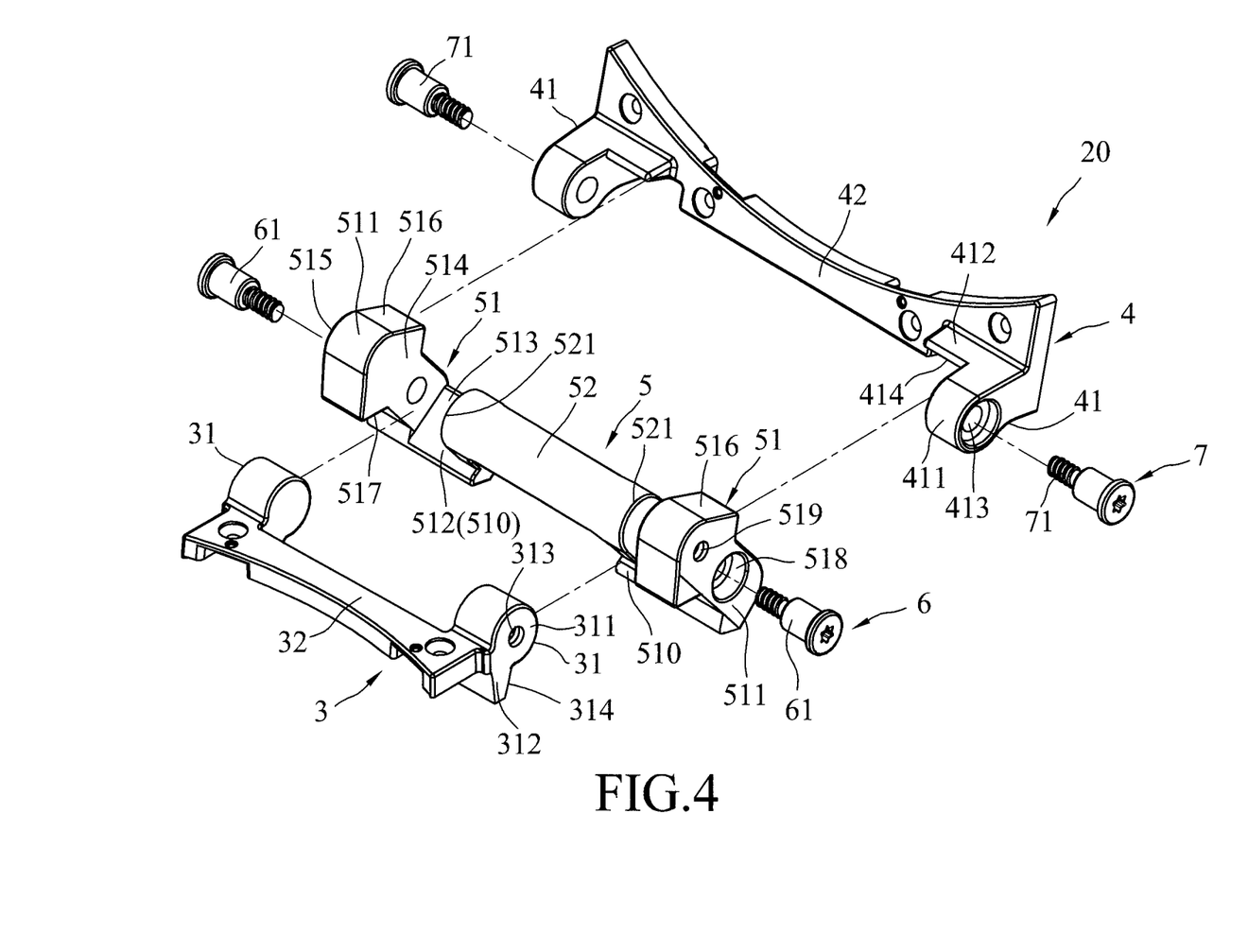
FIG. 4 is an exploded perspective view illustrating a hinge mechanism of the first embodiment.
Figure 5:
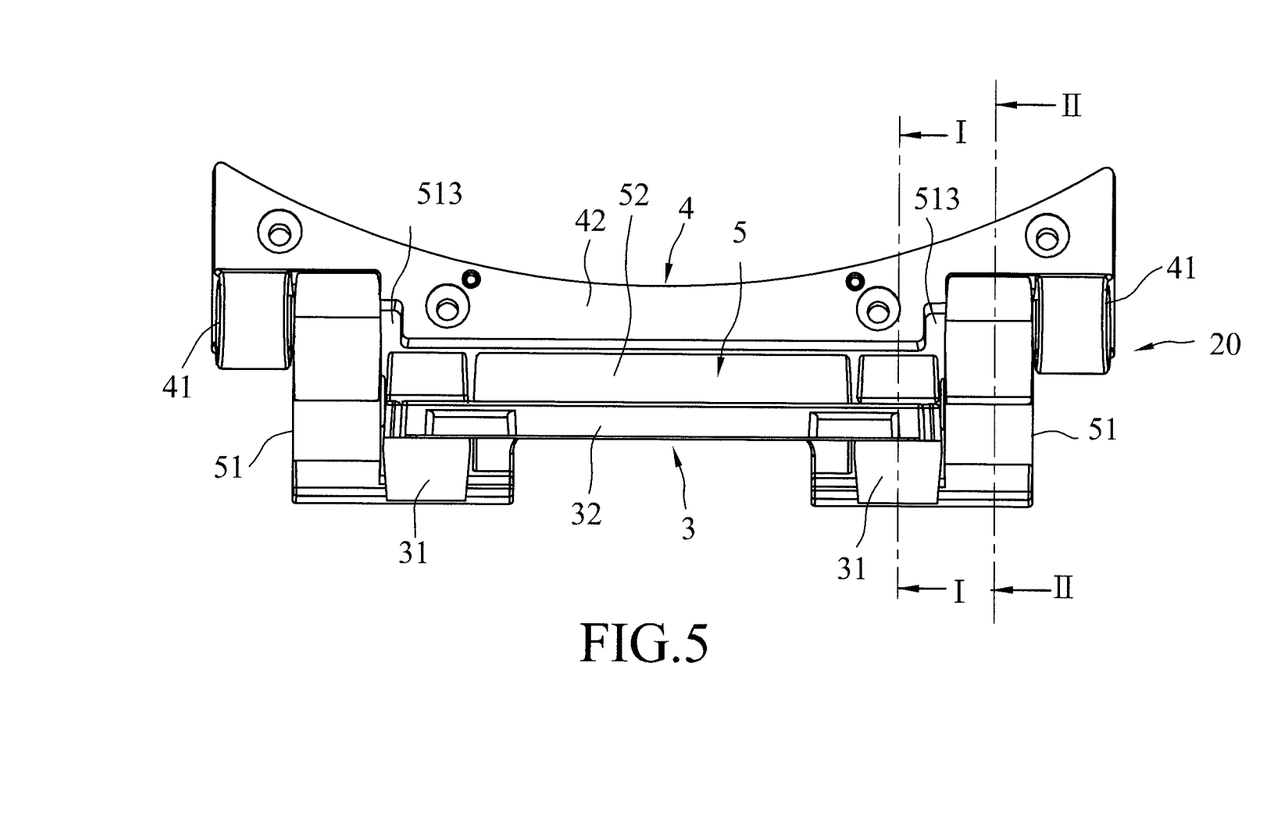
FIG. 5 is a front view of the hinge mechanism of the first embodiment.
Figure 6:
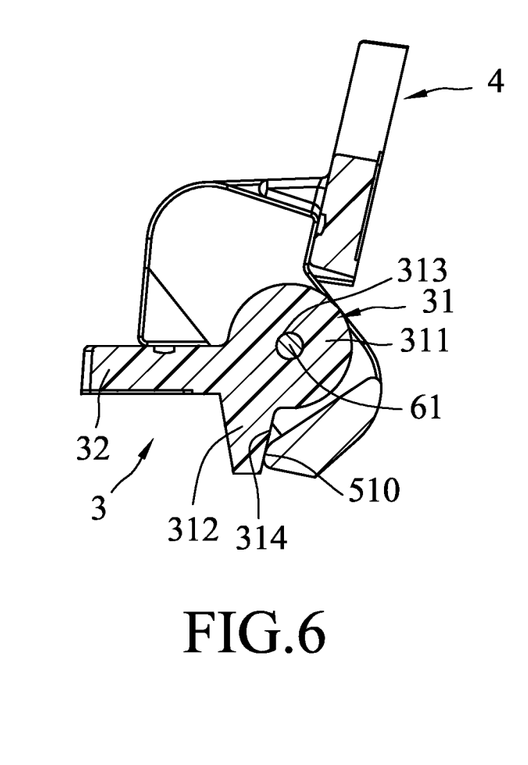
FIG. 6 is a sectional view taken from line I-I of FIG. 5, illustrating the hinge mechanism in an open position.
Figure 7:
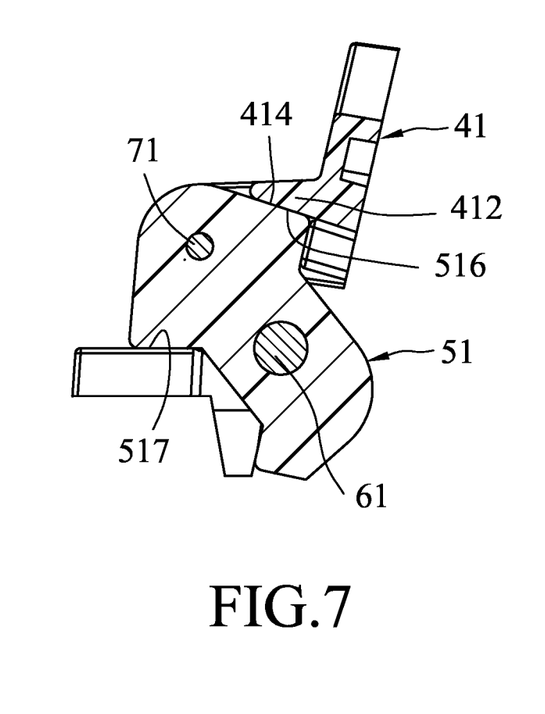
FIG. 7 is a sectional view taken from line II-II of FIG. 5, illustrating the hinge mechanism in the open position.

Referring to FIGS. 3 to 5, a first embodiment of a cooking device 2 according to the disclosure includes a first object 21, a second object 22, and a hinge mechanism 20 connecting the first object 21 and the second object 22 to allow relative folding and unfolding movements with respect to each other. The first object 21 has a first shell 211 and a first grill plate 212 mounted on the first shell 211. The first grill plate 212 has a lower peripheral rim 213, and is in the form of a shallow dish. The second object 22 has a second shell 221 and a second grill plate 222 mounted on the second shell 221 and configured to be superimposed upon the first grill plate 212. The cooking device 2 of this embodiment is exemplified as a grill device, and may be any cooking device that has first and second objects 21, 22 pivotably connected to each other to allow relative folding and unfolding movements with respect to each other.

The hinge mechanism 20 is configured to be shiftable from an open position to a first closed position, or from the open position to a second closed position. For example, when the hinge mechanism 20 is mounted on the first object 21 having the shallow grill plate 212 as shown in FIG. 3, the hinge mechanism 20 is shiftable between the open position and the first closed position. The hinge mechanism 20 includes a first coupling seat 3 connected with the first object 21, a second coupling seat 4 connected with the second object 22, a pivot mounting seat 5, a first pivot unit 6 disposed to pivotably connect the first coupling seat 3 with the pivot mounting seat 5 to permit rotation relative to each other about a first pivot axis, and a second pivot unit 7 disposed to pivotably connect the second coupling seat 4 with the pivot mounting seat 5 to permit rotation relative to each other about a second pivot axis that is parallel to and offset from the first pivot axis.

The first coupling seat 3 has two first coupling portions 31 which are spaced apart from each other in a left-and-right direction, and a first coupling leaf 32 which is connected with the first coupling portions 31 and which is mounted to the first shell 211 of the first object 21. Each of the first coupling portions 31 has a first pivot joint 311 of a cylindrical shape, and a first protrusion 312 which protrudes radially from the first pivot joint 311. The first pivot joint 311 has a first coupling hole 313 in the form of a threaded hole. The first protrusion 312 has a first positioning surface 314 formed thereon.

The second coupling seat 4 has two second coupling portions 41 which are spaced apart from each other in the left-and-right direction, and a second coupling leaf 42 which is connected with and between the second coupling portions 41 and which is mounted to the second object 22. Each of the second coupling portions 41 has a second pivot joint 411 which has a second coupling hole 413 formed therethrough, and a second protrusion 412 which protrudes from an inboard side of the second pivot joint 411 and which has a stabilizing surface 414 formed thereon.

The pivot mounting seat 5 has two pivot mounting portions 51 which are spaced apart from each other in the left-and-right direction, and a middle connecting portion 52 which extends to interconnect the pivot mounting portions 51 and which has two opposite end surfaces 521. Each of the pivot mounting portions 51 has a pivot block 511 and a connecting wall 512 which is connected between the pivot block 511 and the middle connecting portion 52. The pivot block 511, the connecting wall 512 and the adjacent end surface 521 cooperatively define a pivot slot 513. The first pivot joints 311 of the first coupling seat 3 are respectively and rotatably mounted in the pivot slots 513. The second pivot joints 411 of the second coupling seat 4 are respectively and rotatably mounted on and laterally of the pivot blocks 511 to have the second protrusions 412 protrude toward the pivot blocks 511.

The pivot block 511 of each pivot mounting portion 51 has inboard and outboard surfaces 514, 515 opposite to each other in the left-and-right direction, a first abutting surface 516 interposed between the inboard and outboard surfaces 514, 515 to abut against the stabilizing surface 414 of the second coupling seat 4, and a second abutting surface 517 interposed between the inboard and outboard surfaces 514, 515 and angularly displaced from the first abutting surface 516, and a first pivot hole 518 extending from the inboard surface 514 to the outboard surface 515 to define the first pivot axis, and a second pivot hole 519 in the form of a threaded hole and extending to define the second pivot axis. The connecting wall 512 of each pivot mounting portion 51 has a second positioning surface 510 disposed to abut against the first positioning surface 314.

The first pivot unit 6 has two first pivot shafts 61 each of which extends along the first pivot axis through the respective first pivot hole 518 and is threadedly engaged in the respective first coupling hole 313 to pivotably connect the first pivot joint 311 with the pivot block 511. Thus, the pivot mounting seat 5 is pivotably mounted on the first coupling seat 3 to permit rotation relative to each other about the first pivot axis. The second pivot unit 7 has two second pivot shafts 71 each of which extends along the second pivot axis through the respective second coupling hole 413 and is threadedly engaged in the respective second pivot hole 519 to pivotably connect the second pivot joint 411 with the pivot block 511. Thus, the second coupling seat 4 is pivotably mounted on the pivot mounting seat 5 to permit rotation relative to each other about the second pivot axis.

With reference to FIGS. 3, 4, 6 and 7, when the hinge mechanism 20 is in the open position, the second object 22 is unfolded with respect to the first object 21 and is included therewith by an unfolded angle of about 105 degrees. In this state, each second positioning surface 510 of the pivot mounting seat 5 abuts against the respective first positioning surface 314 of the first coupling seat 3 to keep the hinge mechanism 20 in the open position at the unfolded angle. Meanwhile, each stabilizing surface 414 of the second coupling seat 4 abuts against the respective first abutting surface 516 of the pivot mounting seat 5 to further keep the hinge mechanism 20 in the open position for facilitating placement of food on the first grill plate 212.

Figure 8:
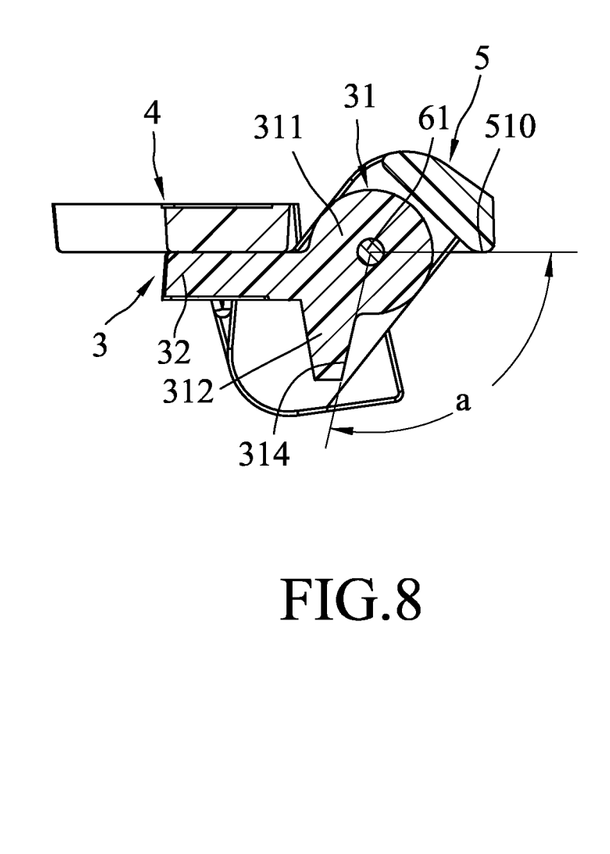
FIG. 8 is a sectional view similar to FIG. 6, illustrating the hinge mechanism in a first closed position.
Figure 9:
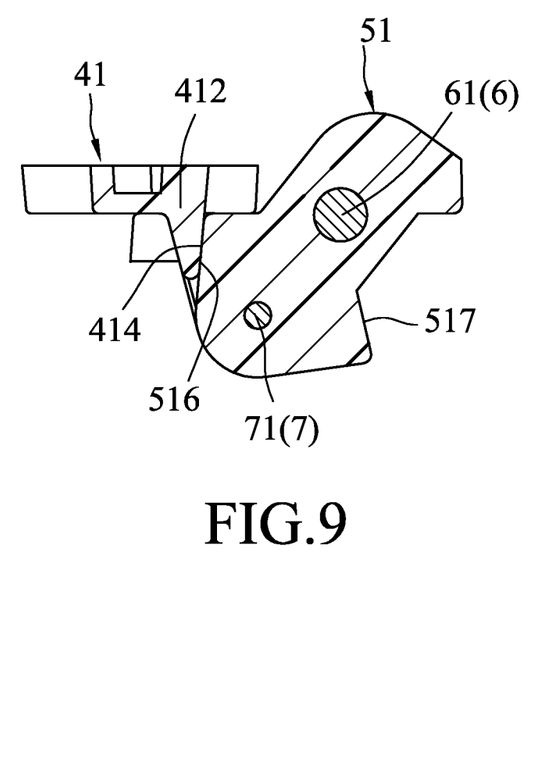
FIG. 9 is a sectional view similar to FIG. 7, illustrating the hinge mechanism in the first closed position.

With reference to FIGS. 3, 4, 8 and 9, when the second object 22 is folded toward the first object 21, with each stabilizing surface 414 kept in abutment against the respective first abutting surface 516, the second coupling seat 4 and the pivot mounting seat 5 are synchronously rotated about the first pivot axis relative to the first coupling seat 3 in a stabilized manner until the hinge mechanism 20 is shifted to the first closed position, where each second positioning surface 510 of the pivot mounting seat 5 is moved away from the respective first positioning surface 314 of the first coupling seat 3 and is included therewith by an included angle (a). The included angle (a) is more than 90 degrees, preferably ranging from 90 to 120 degrees, and being 105 degrees as an example. In other words, in this embodiment, the hinge mechanism 20 is installed on the cooking device 2 having the first grill plate 212 with a shallow peripheral rim 213, and the hinge mechanism 20 is operable by a user to shift between the first closed position (as shown in FIGS. 8 and 9) and the open position (as shown in FIGS. 6 and 7).

Figure 10:
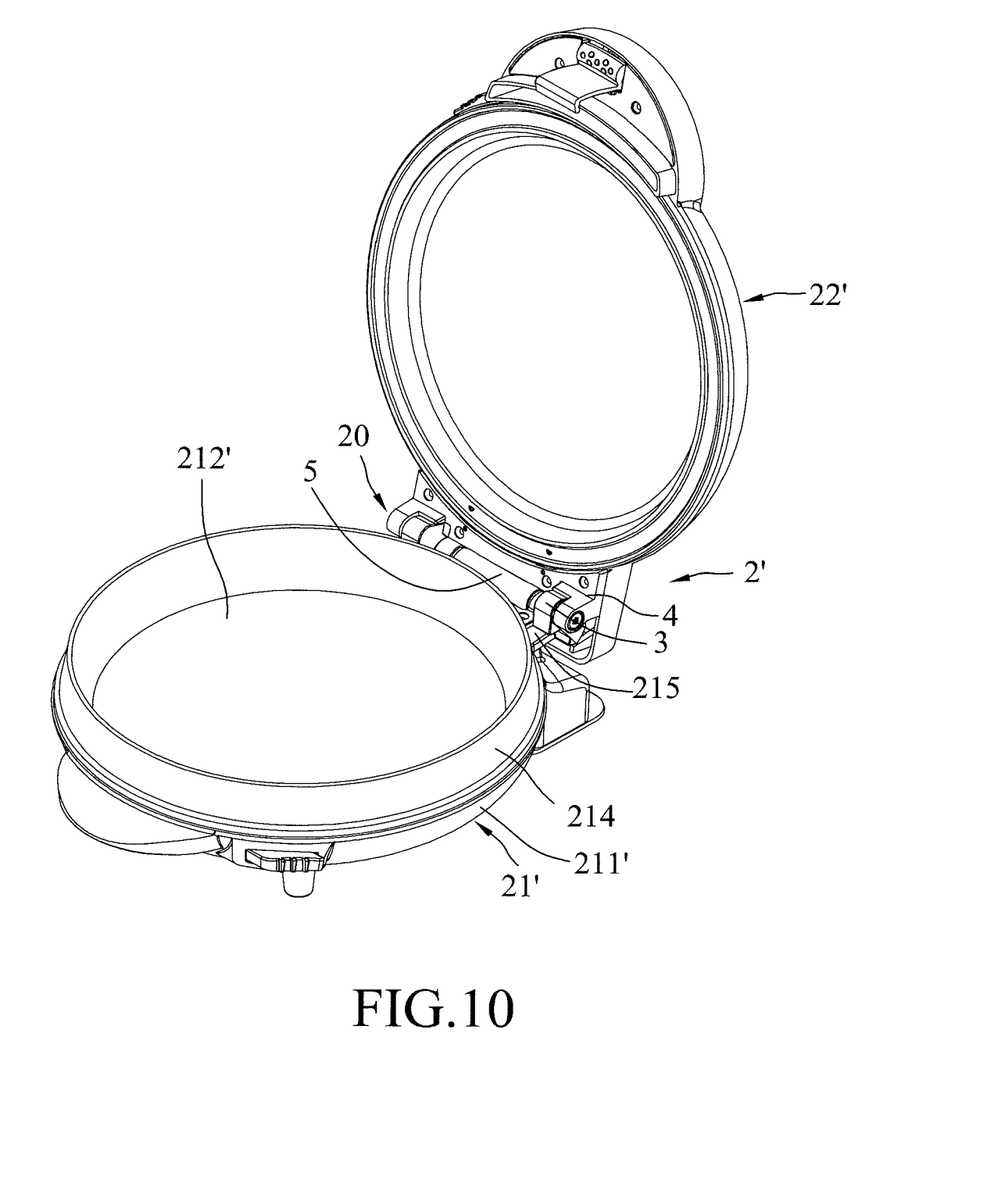
FIG. 10 is a perspective view illustrating a second embodiment of a cooking device according to the disclosure.
Figure 11:
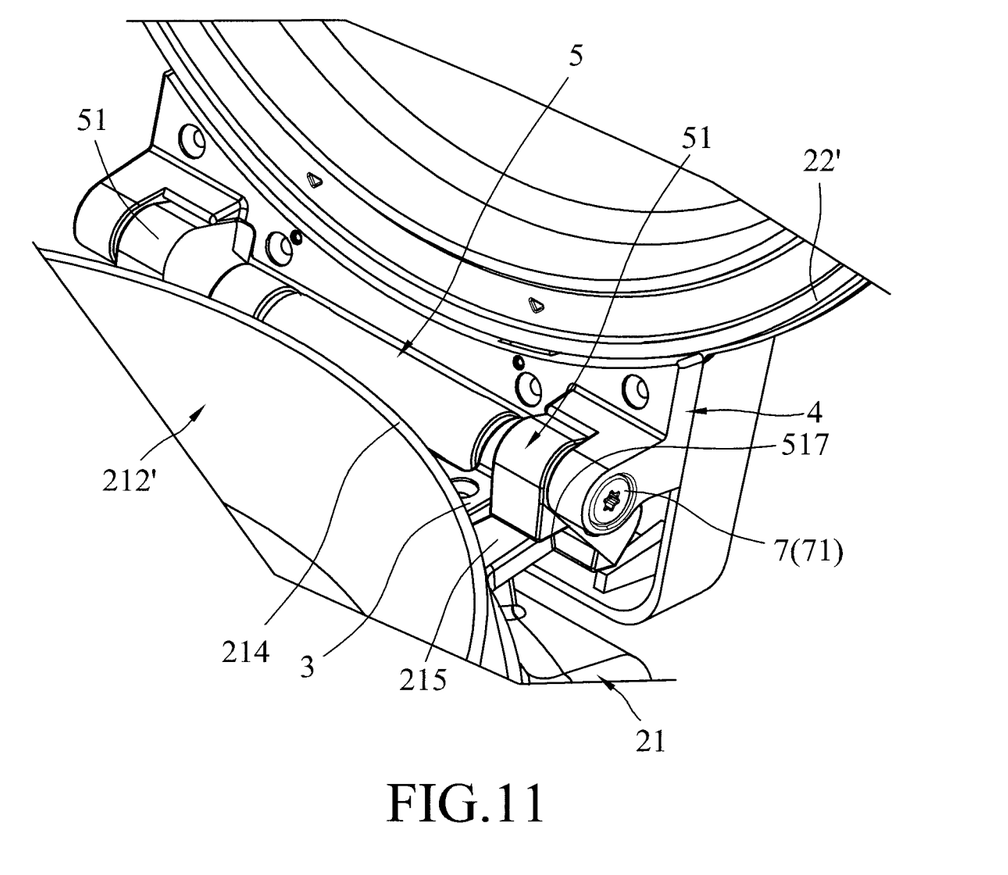
FIG. 11 is a fragmentary perspective view illustrating a hinge mechanism and first and second objects of the second embodiment.

Referring to FIGS. 10 and 11, in a second embodiment, the cooking device 2' includes a first object 21', a second object 22', and a hinge mechanism 20 which is similar to that of the previous embodiment. The first object 21' has a first grill plate 212' of which a higher peripheral rim 214 projects from a first shell 211' by a height larger than that of the first grill plate 212 in the previous embodiment. Additionally, the first shell 211' has two positioning protrusions 215 which protrude therefrom and which are spaced apart from each other in a left-and-right direction.

Figure 12:
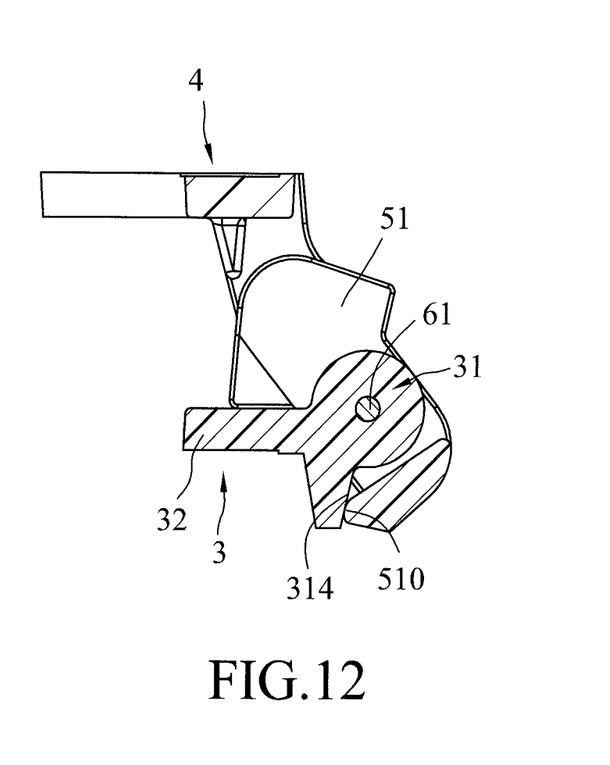
FIG. 12 is a sectional view similar to FIG. 6, illustrating the hinge mechanism of the second embodiment in a second closed position.
Figure 13:
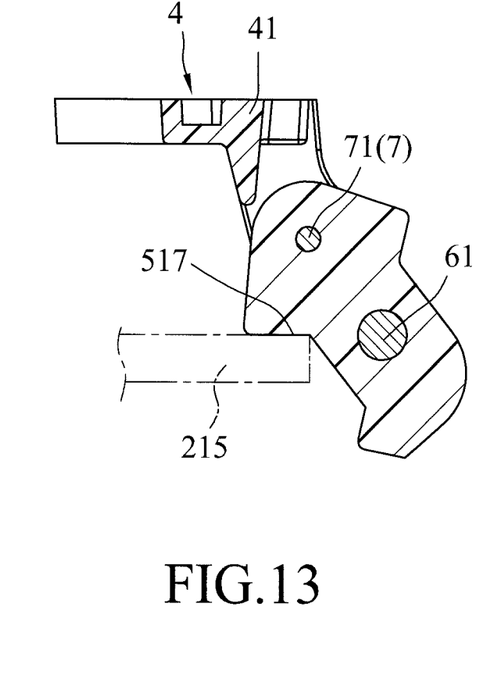
FIG. 13 is a sectional view similar to FIG. 7, illustrating the hinge mechanism of the second embodiment in the second closed position.

With reference to FIGS. 11 to 13, when the hinge mechanism 20 is shifted from the open position (with reference to FIGS. 6 and 7) to the second closed position, the pivot mounting seat 5 is kept unmoved relative to the first coupling seat 3, and the second coupling seat 4 is rotated about the second pivot axis relative to the pivot mounting seat 5. Once the second object 22' is superimposed upon the first object 21', the second abutting surfaces 517 of the pivot mounting seat 5 respectively abut against the positioning protrusions 215 to keep the hinge mechanism 20 in the second closed position.

Specifically, the hinge mechanisms 20 of the first and second embodiments have the same structure but can be respectively used with the first grill plates 212, 212' with lower and higher peripheral rims 213, 213' to be shifted from the open position to the first and second closed positions, respectively. When the hinge mechanism 20 is shifted from the open position to the first closed position, the pivot mounting seat 5 and the second coupling seat 4 are rotated synchronously about the first pivot axis relative to the first coupling seat 3. When the hinge mechanism 20 is shifted from the open position to the second closed position, only the second coupling seat 4 is rotated about the second pivot axis relative to the pivot mounting seat 5. The first and second pivot axes are offset from each other by a height difference that corresponds to the height difference between the higher and lower peripheral rims 213', 213 of the first grill plates 212', 212. Hence, the first and second coupling leaves 32, 42 are almost in the same horizontal plane when the hinge mechanism 20 is in the first closed position. In the second closed position, the second coupling leaf 42 is higher than the first coupling leaf 32 with a height difference that corresponds to the height difference between the higher and lower peripheral rims 213', 213. As illustrated, with the abutting engagement of the first and second positioning surfaces 314, 510, the abutting engagement of the stabilizing surface 414 and the first abutting surface 516, and the abutting engagement of the second abutting surface 517 and the positioning protrusion 215 of the first shell 211', the operation of the hinge mechanism 20 is stable and safe when shifting between the open position and the first closed position, and between the open position and the second closed position. Moreover, with the hinge mechanism 20 disposed to connect the first and second objects of the cooking device, the second objects 22, 22' can be kept stable and parallel to the first objects 21, 21' in the first and second closed positions. Therefore, the hinge mechanism 20 and the cooking device of the disclosure have a wide applicability. Furthermore, the hinge mechanism 20 of the disclosure may be mounted at rear sides of the first and second objects 21, 22 rather than at two sides thereof, thereby rendering a compact structure and enhancing the outer appearance of the cooking device.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A hinge mechanism for connecting a selected one of two first objects and a second object to allow relative folding and unfolding movements with respect to each other, the first objects respectively having a first grill plate with a lower peripheral rim and a higher peripheral rim, comprising: a first coupling seat adapted to be connected with the selected first object, said first coupling seat having at least one first coupling portion; a second coupling seat adapted to be connected with the second object, said second coupling seat having at least one second coupling portion; a pivot mounting seat having at least one pivot mounting portion which is pivotably connected with both of said first and second coupling portions; a first pivot unit disposed to pivotably connect said first coupling seat with said pivot mounting seat to permit rotation relative to each other about a first pivot axis; and a second pivot unit disposed to pivotably connect said second coupling seat with said pivot mounting seat to permit rotation relative to each other about a second pivot axis such that, when both said pivot mounting seat and said second coupling seat are rotated relative to said first coupling seat about the first pivot axis, said hinge mechanism is shifted between an open position and a first closed position, where the second object covers the first grill plate with the lower peripheral rim, and that, when said second coupling seat is rotated relative to said pivot mounting seat about the second pivot axis, said hinge mechanism is shifted between the open position and a second closed position, where the second object covers the first grill plate with the higher peripheral rim, said pivot mounting portion of said pivot mounting seat having a first abutting surface and a second abutting surface which is disposed to abut against the selected first object to keep said hinge mechanism in the second closed position.

2. The hinge mechanism as claimed in claim 1, wherein the second pivot axis is parallel to and offset from the first pivot axis, said first coupling portion having a first positioning surface, said second coupling portion having a stabilizing surface, said pivot mounting portion having a second positioning surface which abuts against said first positioning surface to keep said hinge mechanism in the open position, and said first abutting surface such that, when said hinge mechanism is shifted between the open position and the first closed position, said first abutting surface is kept in abutment against said stabilizing surface so as to stabilize synchronous rotation of said pivot mounting seat and said second coupling seat relative to said first coupling seat about the first pivot axis.

3. The hinge mechanism as claimed in claim 1, wherein the second pivot axis is parallel to and offset from the first pivot axis, said first coupling seat having two of said first coupling portions which are spaced apart from each other, and each of which has said first positioning surface, said second coupling seat having two of said second coupling portions each of which has said stabilizing surface, said pivot mounting seat having two of said pivot mounting portions each of which is pivotably connected with both of said first and second coupling portions at a same side thereof, each of said pivot mounting portions having said second positioning surface and said first abutting surface.

4. The hinge mechanism as claimed in claim 3, wherein said pivot mounting seat has a middle connecting portion which extends to interconnect said pivot mounting portions, each of said pivot mounting portions having a pivot block which has said first and second abutting surfaces formed thereon, a connecting wall which is connected between said pivot block and said middle connecting portion and which has said second positioning surface formed thereon, and a pivot slot which is interposed between said pivot block and said middle connecting portion, each of said first coupling portions of said first coupling seat having a first pivot joint which is rotatably mounted in said pivot slot, and a first protrusion which protrudes from said first pivot joint and which has said first positioning surface formed thereon.

5. The hinge mechanism as claimed in claim 3, wherein said pivot mounting seat has a middle connecting portion which extends to interconnect said pivot mounting portions, each of said pivot mounting portions having a pivot block which has said first and second abutting surfaces formed thereon, a connecting wall which is connected between said pivot block and said middle connecting portion and which has said second positioning surface formed thereon, and a pivot slot which is interposed between said pivot block and said middle connecting portion, each of said second coupling portions of said second coupling seat having a second pivot joint which is rotatably mounted on and laterally of said pivot block, and a second protrusion which protrudes from said second pivot joint toward said pivot block and which has said stabilizing surface formed thereon.

6. The hinge mechanism as claimed in claim 5, wherein each of said first coupling portion of said first coupling seat has a first pivot joint which is rotatably mounted in said pivot slot, and a first protrusion which protrudes from said first pivot joint and which has said first positioning surface formed thereon.

7. The hinge mechanism as claimed in claim 6, wherein said first coupling seat has a first coupling leaf which is connected with said first coupling portions and which is adapted to be mounted to the first object, and said second coupling seat has a second coupling leaf which is connected with said second coupling portions and which is adapted to be mounted to the second object.

8. The hinge mechanism as claimed in claim 6, wherein said first pivot unit has two first pivot shafts each of which extends along the first pivot axis and pivotably connects said first pivot joint with said pivot block to permit rotation relative to each other about the first pivot axis, and said second pivot unit has two second pivot shafts each of which extends along the second pivot axis and pivotably connects said second pivot joint with said pivot block to permit rotation relative to each other about the second pivot axis.

9. A cooking device comprising:
two first objects respectively having first grill plates with a lower peripheral rim and a higher peripheral rim;
a second object; and
a hinge mechanism including
a first coupling seat connected with a selected one of said first objects, said first coupling seat having at least one first coupling portion;
a second coupling seat connected with said second object, said second coupling seat having at least one second coupling portion;
a pivot mounting seat having at least one pivot mounting portion which is pivotably connected with both of said first and second coupling portions;
a first pivot unit disposed to pivotably connect said first coupling seat with said pivot mounting seat to permit rotation relative to each other about a first pivot axis; and
a second pivot unit disposed to pivotably connect said second coupling seat with said pivot mounting seat to permit rotation relative to each other about a second pivot axis such that, when both said pivot mounting seat and said second coupling seat are rotated relative to said first coupling seat about the first pivot axis, said hinge mechanism is shifted between an open position and a first closed position, where said second object covers said first grill plate with said lower peripheral rim, and that, when said second coupling seat is rotated relative to said pivot mounting seat about the second pivot axis, said hinge mechanism is shifted between the open position and a second closed position, where said second object covers said first grill plate with said higher peripheral rim, said pivot mounting portion of said pivot mounting seat having a first abutting surface and a second abutting surface which is disposed to abut against said selected first object to keep said hinge mechanism in the second closed position.

10. The cooking device as claimed in claim 9, wherein the second pivot axis is parallel to and offset from the first pivot axis, said first coupling seat having two of said first coupling portions which are spaced apart from each other, and each of which has a first positioning surface, said second coupling seat having two of said second coupling portions each of which has a stabilizing surface, said pivot mounting seat having two of said pivot mounting portions each of which is pivotably connected with both of said first and second coupling portions at a same side thereof, each of said pivot mounting portions having a second positioning surface which is disposed to abut against said first positioning surface to keep said hinge mechanism in the open position, and said first abutting surface such that, when said hinge mechanism is shifted between the open position and the first closed position, said first abutting surface is kept in abutment against said stabilizing surface so as to stabilize synchronous rotation of said pivot mounting seat and said second coupling seat relative to said first coupling seat about the first pivot axis.

11. The cooking device as claimed in claim 10, wherein each of said pivot mounting portions of said pivot mounting seat has said second abutting surface.

12. The cooking device as claimed in claim 11, wherein said first object has a first shell and said first grill plate which is mounted on said first shell and which has said higher peripheral rim, said first shell having two positioning protrusions which protrude therefrom and which are spaced apart from each other such that said second abutting surfaces of said pivot mounting portions abut against said positioning protrusions to keep said hinge mechanism in the second closed position.

13. The cooking device as claimed in claim 11, wherein said pivot mounting seat has a middle connecting portion which extends to interconnect said pivot mounting portions, each of said pivot mounting portions having a pivot block which has said first and second abutting surfaces formed thereon, a connecting wall which is connected between said pivot block and said middle connecting portion and which has said second positioning surface formed thereon, and a pivot slot which is interposed between said pivot block and said middle connecting portion, each of said second coupling portions of said second coupling seat having a second pivot joint which is rotatably mounted on and laterally of said pivot block, and a second protrusion which protrudes from said second pivot joint toward said pivot block and which has said stabilizing surface formed thereon.

14. The cooking device as claimed in claim 13, wherein each of said first coupling portion of said first coupling seat has a first pivot joint which is rotatably mounted in said pivot slot, and a first protrusion which protrudes from said first pivot joint and which has said first positioning surface formed thereon.

15. The cooking device as claimed in claim 14, wherein said first coupling seat has a first coupling leaf which is connected with said first coupling portions and which is mounted to said first object, and said second coupling seat has a second coupling leaf which is connected with said second coupling portions and which is mounted to said second object.

* * * * *